US011354336B2

(12) United States Patent
Leiseboer et al.

(10) Patent No.: US 11,354,336 B2
(45) Date of Patent: Jun. 7, 2022

(54) FAULT-TOLERANT KEY MANAGEMENT SYSTEM

(71) Applicant: QuintessenceLabs Pty Ltd., Deakin (AU)

(72) Inventors: John Leiseboer, Deakin (AU); Mayank Daswani, Deakin (AU); Teresa Bradbury, Deakin (AU); Florian Poppa, Deakin (AU); Kenli Chong, Deakin (AU); John Green, Deakin (AU); Warren Armstrong, Deakin (AU); Martin Shannon, Deakin (AU); Vello Tabur, Deakin (AU)

(73) Assignee: QuintessenceLabs Pty Ltd., Deakin (AU)

(*) Notice: Subject to any disclaimer, the term of this patent is extended or adjusted under 35 U.S.C. 154(b) by 154 days.

(21) Appl. No.: 16/783,969

(22) Filed: Feb. 6, 2020

(65) Prior Publication Data

US 2020/0175036 A1 Jun. 4, 2020

Related U.S. Application Data

(63) Continuation of application No. 15/286,326, filed on Oct. 5, 2016, now Pat. No. 10,606,864.
(Continued)

(51) Int. Cl.
*G06F 17/00* (2019.01)
*G06F 7/00* (2006.01)
(Continued)

(52) U.S. Cl.
CPC .......... *G06F 16/275* (2019.01); *G06F 16/252* (2019.01); *G06F 16/27* (2019.01);
(Continued)

(58) Field of Classification Search
CPC ...... G06F 16/275; G06F 16/27; G06F 16/273; G06F 16/252; H04L 9/085; H04L 9/0869;
(Continued)

(56) References Cited

U.S. PATENT DOCUMENTS 6,289,382 B1 * 9/2001 Bowman-Amuah ... H04L 67/42
709/226
6,317,192 B1 * 11/2001 Silverbrook ............ G06F 21/79
348/222.1
(Continued)

FOREIGN PATENT DOCUMENTS

AU 2016238870 B2 5/2019

OTHER PUBLICATIONS

U.S. Appl. No. 15/402,015 Notice of Allowance dated Jan. 27, 2020, 13 pages.
(Continued)

*Primary Examiner* — Pavan Mamillapalli
(74) *Attorney, Agent, or Firm* — Kilpatrick Townsend & Stockton LLP

(57) ABSTRACT

A configuration for a key management system is provided for managing cryptographic keys in cryptosystems. The configuration includes the use of database replication to improve the reliability, accessibility, and partition tolerance of the key management system. The configuration also includes the use of database sharding and distributed networks to improve the functionality of the key management system. From a logical level, the system can appear multi-master because client software can connect with any compute node in a plurality of compute nodes and perform key management operations on the entire key database from that compute node. From a physical level, the system can be a master-slave configuration with each database shard replication group having a single master shard instance and one
(Continued)

or more slave shard instances. In some examples, the present disclosure provides better redundancy, load balancing, availability, and partition tolerance for key management systems.

9 Claims, 9 Drawing Sheets

Related U.S. Application Data

(60) Provisional application No. 62/375,874, filed on Aug. 16, 2016.

(51) Int. Cl.
| | |
|---|---|
| *G06F 16/27* | (2019.01) |
| *G06F 16/25* | (2019.01) |
| *H04L 9/08* | (2006.01) |
| *H04L 9/40* | (2022.01) |
| *H04L 9/14* | (2006.01) |

(52) U.S. Cl.
CPC ............ *G06F 16/273* (2019.01); *H04L 9/085* (2013.01); *H04L 9/0869* (2013.01); *H04L 9/0894* (2013.01); *H04L 9/14* (2013.01); *H04L 63/0428* (2013.01); *H04L 63/06* (2013.01); *H04L 63/061* (2013.01)

(58) Field of Classification Search
CPC ..... H04L 9/0894; H04L 9/14; H04L 63/0428; H04L 63/06; H04L 63/061
USPC ......................................................... 707/611
See application file for complete search history.

(56) References Cited

U.S. PATENT DOCUMENTS

| | | | |
|---|---|---|---|
| 6,332,163 B1* | 12/2001 | Bowman-Amuah | H04L 12/4604 719/329 |
| 6,356,715 B1* | 3/2002 | Silverbrook | G06F 21/79 347/101 |
| 6,362,868 B1* | 3/2002 | Silverbrook | G06F 21/86 355/72 |
| 6,362,869 B1* | 3/2002 | Silverbrook | H04N 1/2154 347/101 |
| 8,191,078 B1 | 5/2012 | Cullen et al. | |
| 8,244,831 B1* | 8/2012 | McLennan | H04L 67/1095 709/200 |
| 8,312,356 B1* | 11/2012 | Cousins | H03M 13/15 708/316 |
| 8,429,162 B1 | 4/2013 | Wang et al. | |
| 8,850,013 B2* | 9/2014 | Waldman | G06F 9/5083 709/234 |
| 8,990,375 B2 | 3/2015 | Li et al. | |
| 9,128,877 B1* | 9/2015 | Cousins | H03M 13/616 |
| 9,165,002 B1* | 10/2015 | Lazier | G06F 16/162 |
| 9,251,097 B1 | 2/2016 | Kumar et al. | |
| 9,331,989 B2 | 5/2016 | Dover | |
| 9,344,458 B2 | 5/2016 | Hubler et al. | |
| 9,491,311 B1 | 11/2016 | Sharma | |
| 10,331,634 B2 | 6/2019 | Hu et al. | |
| 10,606,864 B2 | 3/2020 | Leiseboer et al. | |
| 10,671,643 B2 | 6/2020 | Leiseboer et al. | |
| 2006/0282662 A1* | 12/2006 | Whitcomb | H04L 63/0853 713/156 |
| 2009/0204859 A1* | 8/2009 | Cousins | G06F 11/1004 708/492 |
| 2009/0271762 A1* | 10/2009 | Taylor | G06F 21/6227 707/999.107 |
| 2010/0293380 A1 | 11/2010 | Wiseman et al. | |
| 2012/0017096 A1 | 1/2012 | Snider | |
| 2014/0089117 A1* | 3/2014 | Schumacher | G06Q 20/40 705/40 |
| 2014/0157393 A1 | 6/2014 | Whitcomb | |
| 2014/0331050 A1 | 11/2014 | Armstrong et al. | |
| 2016/0019745 A1* | 1/2016 | Graham | A63F 13/71 463/31 |
| 2016/0065498 A1* | 3/2016 | Harper | H04L 47/826 709/223 |
| 2016/0154963 A1* | 6/2016 | Kumar | H04L 9/0825 713/189 |
| 2016/0191250 A1 | 6/2016 | Bestler et al. | |
| 2016/0191509 A1* | 6/2016 | Bestler | H04L 63/0876 713/193 |
| 2016/0306854 A1 | 10/2016 | Hegde et al. | |
| 2017/0206148 A1 | 7/2017 | Mehta et al. | |
| 2018/0052901 A1 | 2/2018 | Leiseboer et al. | |
| 2018/0143774 A1 | 5/2018 | Carson et al. | |

OTHER PUBLICATIONS

U.S. Appl. No. 15/402,015 Non-Final Office Action dated Oct. 2, 2019, 7 pages.
First Examination Report for Application No. AU2016238870, dated Feb. 6, 2018, 7 pages.
Notice of Allowance for Application No. AU2016238870, dated Jan. 31, 2019, 3 pages.
Wikipedia, "Shard (Database Architecture)", Viewed on the Internet Jan. 9, 2012, retrieved from the Internet <URL:https://web.archive.org/web/20160809161540/https://en.wikipedia.org/wiki/Shard_(database_architecture)>, Aug. 9, 2016, 6 pages.
U.S. Appl. No. 15/286,326 Non-Final Office Action dated Aug. 8, 2019, 15 pages.
U.S. Appl. No. 15/286,326 Notice of Allowance dated Nov. 25, 2019, 12 pages.

\* cited by examiner

FAULT-TOLERANT KEY MANAGEMENT SYSTEM

CROSS-REFERENCES TO RELATED APPLICATIONS

This application is a continuation of U.S. patent application Ser. No. 15/286,326, filed on Oct. 5, 2016, entitled "FAULT-TOLERANT KEY MANAGEMENT SYSTEM," which is a non-provisional of and claims the benefit of U.S. Provisional Application No. 62/375,874, filed on Aug. 16, 2016, and entitled "FAULT-TOLERANT KEY MANAGEMENT SYSTEM," which are incorporated herein by reference in their entirety for all purposes.

BACKGROUND

Private data is increasingly being communicated between parties using computers and computing devices throughout the world. With this increase in communication of private data, an increase in the need for security has been created. Various cryptographic algorithms have been developed to allow such security to be maintained.

Some cryptographic algorithms generate a key to be used to both encrypt and decrypt private data. There is a need in the art to improve reliability and performance of storage configurations for keys generated by cryptographic algorithms.

SUMMARY

Embodiments herein implement a key management system for managing cryptographic keys in a cryptosystem. In some implementations, the key management system can use database sharding, database replication, and/or distributed networks to improve the functionality of the key management system. From a logical level, the key management system can appear multi-master because client software can connect with any compute node of a plurality of compute nodes to perform key management operations on a key database included in the plurality of compute nodes. From a physical level, the key management system can be a master-slave configuration with each database shard replication group having a single master shard instance and one or more slave shard instances. In some examples, the present disclosure provides better accessibility, availability, redundancy, reliability, load balancing, and/or partition tolerance for the key management system.

Provided are compute nodes for replication of a key management system with logical multi-master setup on top of physical master-slave configuration. In some implementations, a compute node for managing cryptographic information is provided. For example, a compute node can comprise a local database. The local database can include a master instance and a slave instance of a logical shard of a cryptographic key database. In some examples, the cryptographic key database can be divided into a plurality of logical shards. In such examples, the master instance can include cryptographic data of the cryptographic key database. In some examples, the slave instance can replicate the cryptographic data in a synchronous or an asynchronous manner. In some examples, the local database can include a second slave instance of the shard. In such examples, the slave instance is a first slave instance and the second slave instance replicates the master instance in a synchronous manner or an asynchronous manner.

The compute node can further comprise a key management module. In some examples, the key management module can perform a database operation on the local database. In some examples, the key management module can receive the database operation from a remote device.

The compute node can further include a shard instance property table. In some examples, the shard property table can include information associated with content of the master instance. The compute node can further include an interface to receive a request to configure the cryptographic key database from a remote device. In some examples, the interface can include a graphical user interface, a command line interface, or any combination thereof. The command line interface can use an application programming interface (API) to provide a means of communication to the configuration module by a remote device. The compute node can further include a configuration module to process the request to configure the cryptographic key database.

In some examples, a remote compute node can include a second slave instance. In such examples, the slave instance can be a first slave instance and the second slave instance can replicate the cryptographic data, similar to the first slave instance.

In some implementations, a plurality of compute nodes can be used for managing cryptographic information is provided. For example, the plurality of compute nodes can include a first compute node and a second compute node.

The first compute node can include a first local database and a first key management module. In some examples, the first local database can comprise a first master instance of a first logical shard of a cryptographic key database. In such examples, the first master instance can include first cryptographic data of the cryptographic key database. The first key management module can perform a first database operation on the first local database. In some examples, the first compute node can include a first slave instance of the first logical shard. In such examples, the first slave instance can replicate the first cryptographic data of the first master instance in an asynchronous manner.

In some examples, the first compute node can further include a shard property table. The shard property table can include information associated with content of the first master instance and the second master instance. In some examples, when a third database operation is received by the first key management module, the first key management module can perform the third database operation on the second local database on the second compute node when a determination is made, using the shard property table, that the third database operation is associated with the content of the second master instance.

The second compute node can include a second local database and a second key management module. In some examples, the second local database can comprise a second master instance of a second logical shard of the cryptographic key database. In such examples, the second master instance can include second cryptographic data of the cryptographic key database. The second key management module can perform a second database operation on the second local database. In some examples, the second compute node can include a second slave instance of the first logical shard. In such examples, the second slave instance can replicate the first cryptographic data of the first master instance in a synchronous manner.

In some examples, the second compute node can also include a second shard property table. The second shard property table can include information associated with content of the first master instance and the second master instance. In such examples, when a further database operation is received by the second key management module, the second key management module can perform the fourth database operation on the first local database on the first compute node when a determination is made, using the second shard property table, that the fourth database operation is associated with the content of the first master instance. In some examples, when a fourth database operation is received by the first key management module, the first key management module can be configured to execute one or more instructions to identify cryptographic data, determine a location of the cryptographic data, and execute the fourth database operation on the location. In such examples, the cryptographic data can be associated with the fourth database operation. In some examples, the location (e.g., the first local database or the second local database) can be determined using the shard instance property table.

In some examples, each of the first compute node and the second compute node can further include an interface to receive a request to configure the cryptographic key database from a remote device and/or a configuration module to process the request to configure the cryptographic key database. In some examples, the interface can include at least one or more of a graphical user interface and a command line interface. The command line interface can use an application programming interface (API).

In some examples, the configuration module of the first compute node can process the request when the request is received by the interface of the first compute node. In such examples, the first configuration module can be configured to execute one or more instructions to send the request to the interface of the second compute node when (1) the request is received by the interface of the first compute node and (2) the request is associated with content in the second local database. In some examples, the configuration module of the second compute node can process the request when the request is received by the interface of the second compute node.

In some examples, each of the first compute node and the second compute node can further include a shard property table. In such examples, the shard property table of each of the first compute node and the second compute node can include information associated with master instances of the cryptographic key database. In some examples, the configuration module of the first compute node can update the shard instance property table of the first node. In such examples, the configuration module of the second node can update the shard instance property table of the second node.

In some examples, the first compute node can include a first slave instance of the first logical shard. In such examples, the second compute node can include a second slave instance of the first logical shard. The second slave instance can replicate the first cryptographic data in a synchronous manner.

In some examples, a network partition event can interrupt communication between the first compute node and the second compute node. In such examples, the first slave instance can replicate the first cryptographic data of the first master instance in an asynchronous manner before the network partition event and replicates the first cryptographic data of the first master instance in a synchronous manner after the network partition event. In some examples, the network partition event can be at least one or more of a power outage for the second compute node, a communication cable disconnection between the first compute node and the second node and a planned upgrade or replacement of the second compute node.

In some examples, the first shard property table can further include synchronization priority. The synchronization priority can indicate an order to promote slave instances from replicating in an asynchronous manner to a synchronous manner. In some examples, the first slave instance can be changed to replication in a synchronous manner based on the first shard instance property table.

In some examples, the plurality of compute nodes can further include a load balancer. The load balancer can be configured to execute one or more instructions to receive a request to perform a fourth database operation and send the request to the first compute node or the second compute node based on a load of the plurality of compute nodes. In some examples, the request can be received from a remote device. In such examples, the fourth database operation can be associated with the cryptographic key database.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

Figure 1:
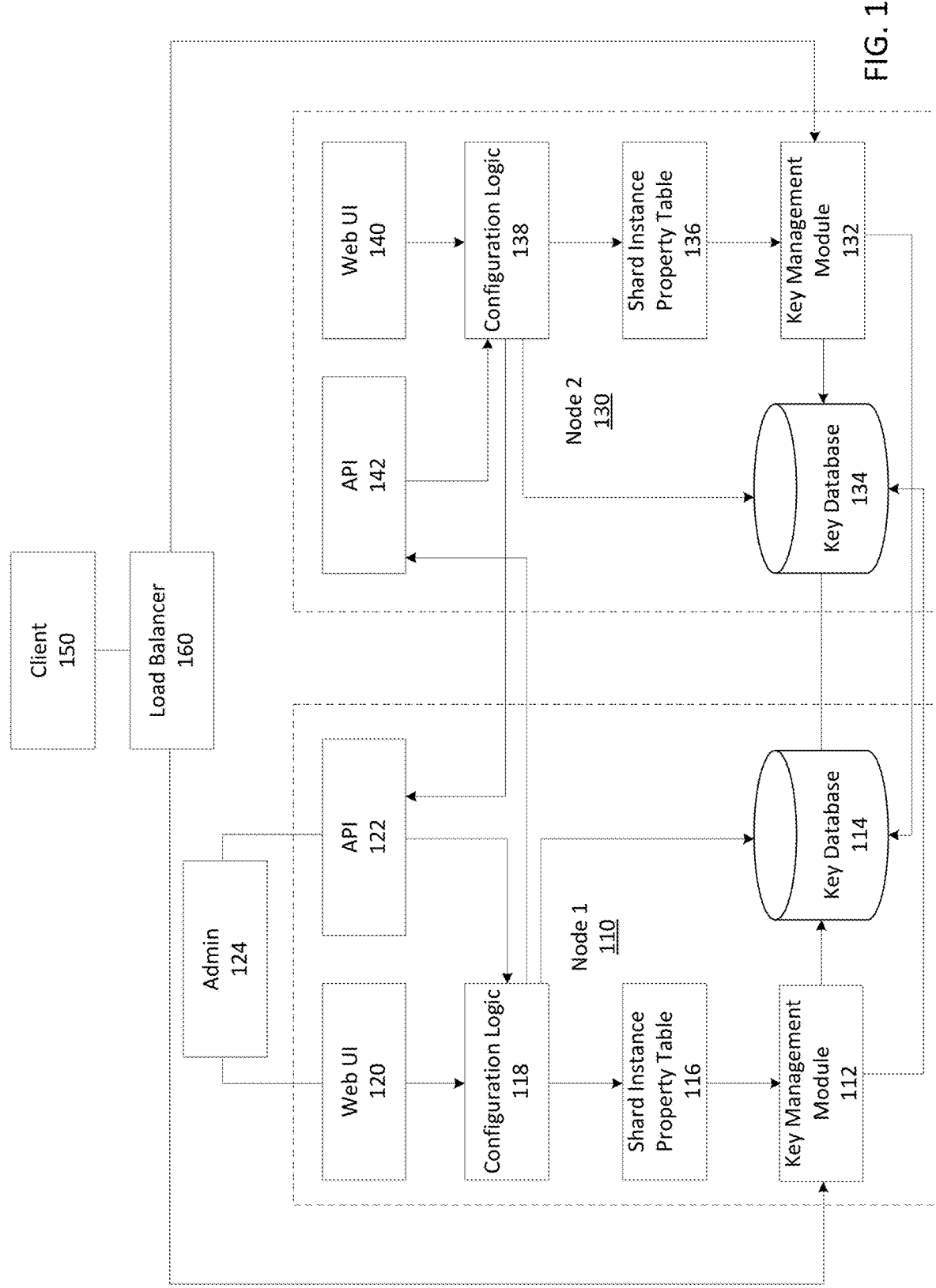
FIG. 1 illustrates an example of a key management system on two compute nodes.

In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of this disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

In describing selected embodiments, various objects or components may be implemented as computing modules. These modules may be general-purpose, or they may have dedicated functions such as memory management, program flow, instruction processing, object storage, etc. The modules can be implemented in any way known in the art. For example, in one embodiment a module is implemented in a hardware circuit including custom very-large-scale integration (VLSI) circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In an exemplary embodiment, one or more of the modules are implemented in software for execution by various types of processors. An identified module of executable code may, for instance, include one or more physical or logical blocks of computer instructions that may, for instance, be organized as an object, procedure, or function. Further, the executables of an identified module need not be physically located together, but may include disparate instructions stored in different locations that, when joined logically together, include the module and achieve the stated purpose for the module. A "module" of executable code could be a single instruction, or many instructions, and may be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, as electronic signals on a system or network.

In some embodiments, higher-level components may be used as modules. For example, one module may include an entire computer acting as a network node. Another module may include an off-the-shelf or custom program, such as a database management system. These higher-level modules may be decomposable into smaller hardware or software modules corresponding to different parts of a software program and identifiable chips (such as a memory chip, an application-specific integrated circuit (ASIC), or a central processing unit (CPU)) within a computer.

A. Terminology

Terms used throughout this disclosure will now be described.

A server can be a computer program and/or a device that provides functionality for one or more other computer programs and/or devices, sometimes referred to as clients. A client can be computer hardware and/or software that accesses a service made available by a server. In some examples, the server can be a computer, compute node, computer system, computing system, or device.

A cryptosystem can include a cryptography module that uses one or more cryptographic algorithms to implement one or more security services (e.g., encryption, decryption, authentication, nonrepudiation, and/or integrity). A cryptographic algorithm can be combined with a cryptographic key to encrypt and/or decrypt data.

A cryptographic key can be a string of bits used by a cryptographic algorithm to encrypt or decrypt data. In some examples, the cryptographic key can be private. A cryptographic key can be symmetric or asymmetric. Symmetric encryption can use one key to encrypt and decrypt data. Asymmetric encryption can use two keys, one for encryption and one for decryption.

A key management system can manage cryptographic data (e.g., one or more cryptographic keys) within a cryptosystem. In some examples, a key management system can read, generate, exchange, store, use, and/or replace one or more cryptographic keys. A key management system can include a cryptographic key database and a key management service. The key management service can be a computer program and/or device that implements key management procedures and policies. In some examples, the key management service can store one or more cryptographic keys in the cryptographic key database.

A compute node can be a physical or virtual host running a key management system. In some examples, a compute node can be a computer, computer system, computing system, or device.

Replication can include duplication of data on one or more physical systems to improve reliability, fault tolerance, and/or accessibility. Database replication can involve storing instances of a database on a distributed network of compute nodes, which can communicate and coordinate one or more actions by passing messages between the compute nodes of the distributed network of compute nodes. In some examples, database replication can involve storing one or more database instances on a distributed network of compute nodes. In some examples, a compute node in a network can communicate with one or more other compute nodes in the network. In a database replication model, a master database may have write permissions, and a slave database can be synchronized to the master database.

In a master-slave replication model, a system can include a single master database with write permission and one or more slave databases that synchronize to the single master database. The master-slave replication model can allow a system to achieve consistency among the compute nodes in a plurality of compute nodes easier.

In a multi-master model, two or more master databases can each have write permission. The multi-master model can allow a system to have more flexibility (but also have increased complexity). The multi-master model can also support improved performance when compute nodes are geographically distributed.

Synchronous replication can utilize an atomic operation on a master database and a replicated slave database. In such examples, an operation is not considered complete until it is confirmed that the operation has completed on both the master database and the replicated slave database (e.g., an indication can be sent from the replicated slave database to the master database that indicates the operation has completed on the replicated slave database). Asynchronous replication can consider an operation complete when a master database acknowledges the operation, independent of the operation completing on the replicated slave database. In such examples, the replicated slave database can perform the operation while the master database continues with an additional operation. Performance can be greatly increased using asynchronous replication; however, the replicated slave database is not guaranteed to have a current copy of data. In some examples, most recent data can be lost.

Database sharding can involve partitioning a database into sub-databases known as shards. A shard can be a logical slice of a database (sometimes referred to as a logical shard). Each shard of the database can be located on a separate compute node in a plurality of compute nodes. In some examples, a shard can include multiple distinct shard instances. A shard instance can be a physical instantiation of a shard on a database instance. In some examples, there can be more than one database instance on a single compute node. For example, the single compute node can include one or more master database instances and one or more slave database instances. In some examples, the single compute node can include one or more master and slave database instances of different database shards. Advantages of sharding can include: improved search performance because of a reduced index size of database shards, better distribution of network load, and improved load performance.

A shard replication group can be a collection of database instances between which data can be replicated. A shard replication group can include a master database and one or more associated slave databases. In some examples, there can be one shard replication group for each database shard.

A local slave database can be a slave database associated with a master database on the same compute node as the master database. A remote slave database can be a slave database associated with a master database on a different compute node than the master database.

Load balancing can distribute a workload across compute nodes in a plurality of compute nodes. A load balancer is a device that implements load balancing.

A network partition can be a temporary division of a computer network into two or more subnetworks that cannot communicate with each other. A network partition event can be an event that causes a network partition. Examples of an unplanned network partition event can include a power outage and a cut network cable. Examples of a planned network partition event can include purposefully partitioning a network to enable replacement or upgrades on a subnetwork.

The CAP theorem states that it is impossible for a distributed computer system to simultaneously provide all three of the following guarantees: consistency (all compute nodes see the same data at the same time), availability (every request receives a response about whether it succeeded or failed), and partition tolerance (the system continues to operate despite arbitrary partitioning due to network failures).

B. Distributed Key Management System

Transmission of data from one device to another can include certain inherent security risks (e.g., the data can be captured by an unauthorized recipient). Cryptosystems, using one or more cryptographic algorithms, can be used to secure the transmission of data. In some examples, a cryptosystem can utilize three algorithms to secure the transmission of data: one for key generation, one for encryption, and one for decryption.

In some examples, key generation can be performed using key material generated by a random number generator. In such examples, a random number generator can generate a sequence of random bits that cannot be reasonably predicted. In some examples, the random number generator can be implemented as a software module. In other examples, the random number generator can be implemented as a hardware random number generator that is coupled to the cryptosystem. A hardware random number generator generates random numbers from a physical process, rather than a software program, such as thermal noise, photoelectric effect, variation in silicon manufacturability, and/or other quantum phenomena. In some examples, a combination of hardware and software may be used in generating random numbers.

However, cryptographic keys produced using an algorithm for key generation need to be managed. In fact, managing cryptographic keys can be the foundation for securing the transmission of data. Conventionally, a key management system can: (1) ensure the security of cryptographic keys, (2) allow operations to be performed on the cryptographic keys, (3) provide for secure key storage, (4) manage key usage authorization, and (5) perform other similar actions.

In some examples, a key management system can include a cryptographic key database and a key management module. The key management module can include procedure, protocols, and policies for managing the one or more cryptographic keys. The key management module can also coordinate client operations from one or more clients. The client operations can be associated with the cryptographic key database (e.g., interfacing with the key management system and acting on the cryptographic key database). Client operations can include key generation, key pair generation, key transport, key sharing, key backup, key restoring from backups, key usage monitoring/control, key pair usage monitoring/control, key rotation, key renewal, key roll-over, meta-data maintenance (e.g., changing status from encrypt/decrypt to decrypt only), security key destruction, secure key archival.

However, a key management system is typically limited to a single device, which can cause problems as an enterprise associated with the key management system becomes larger. The disclosure herein is related to a distributed key management system. For example, a distributed key management system can operate on a plurality of compute nodes (e.g., two compute nodes, three compute nodes, or more compute nodes). In some examples, a copy of the key management system can be included on each of the plurality of compute nodes. However, this solution can create excessive duplication of data. Therefore, in some examples, a cryptographic key database can be divided into two or more logical shards. In such examples, each shard can be included on one or more compute nodes. The disclosure herein is also related to utilizing a master-slave configuration for a cryptographic database in a key management system. For example, there can be multiple instances of the cryptographic database, or each logical shard. Then, instances can be split between the compute nodes such that there are backups of the data in the cryptographic key database. In the case of instances for each logical shard, portions of the cryptographic key database can be distributed among the compute nodes.

And, in some examples, a first compute node, with a first portion of the cryptographic key database, can perform operations on a second compute node, with a second portion of the cryptographic key database. Such examples, from a logical level, can have the key management system appear multi-master because client software can connect with any compute node and perform key management operations on the entire key database from that compute node. For example, each node of a plurality of nodes can include knowledge that allows the node to handle requests for information associated with any master, whether the master is on the node or another node.

From a physical level, the key management system can be a master-slave configuration. For example, an instance of a shard can be a master instance. An instance of a shard can also be a local slave instance or a remote slave instance. In some examples, a database shard replication group can have a single master shard instance and one or more slave shard instances (local or remote). A local slave instance can be located on the same compute node as the master. A remote slave instance can be located on a different compute node than the master.

A slave instance can replicate data (e.g., cryptographic keys) from the master instance in a synchronous manner or an asynchronous manner. The data can be replicated to provide a backup of the data and/or resilience in an event of a network partition or failure of hardware. When the data on the master instance is replicated in a synchronous manner by a slave instance, the master instance can wait to process another request until a slave instance has sent an indication to the master instance that a previous request has been processed by the slave instance. In some examples, a synchronous manner can ensure that data is up to date between the master instance and the slave instance at the expense of efficiency when processing multiple operations. When the master instance replicates in an asynchronous manner, the master instance can process another request before receiving a confirmation that a slave compute node has processed a previous request sent by the master instance. In some examples, an asynchronous manner can be more efficient when processing multiple operations that cause data to be replicated from the master instance to the slave instance.

In some examples, a compute node can include multiple instances of a shard. In some examples, a master instance of a shard and a slave instance of the shard can be located on different compute nodes in the plurality of compute nodes.

The master-slave model described above can provide better consistency and tolerance for network partitioning events. The combination of the master-slave model and database shard replication can provide better efficiency because database shards can be indexed quicker. The combination of the master-slave model and database shard replication can also provide better load balancing because operations can be sent to any compute node.

In some examples, a compute node can further include a configuration logic module. The configuration logic module can coordinate configuration operations on replicated shard database instances. In some examples, a configuration operation can include create, configure, destroy, start, stop, and reconfigure a replicated shard database instance. In some examples, a compute node of a key management system can further include a web user interface (Web UI). The Web UI can be used to interface with a configuration logic module. The compute node can further include an application programming interface (API). The API can be used to interface with the configuration logic module using a command line interface.

In some examples, a compute node can further include a shard instance property table to allow the system to act like a multi-master system. In such examples, the shard instance property table can be used by the compute node to determine another compute node that includes data needed for a user request. The compute node can either send the user request to the other compute node or request the data itself by communicating with the other node.

The shard instance property table can include one or more properties associated with one or more database shard instances. In some examples, the one or more database shard instances can be the database shard instances on the compute node, the database shard instances associated with the database shard instances on the compute node, the database shard instances associated with a master instance on the compute node, master instances in a plurality of compute nodes that include the compute node, the database shard instances in the plurality of compute nodes that includes the compute node, or any portion or combination thereof. A property can include a unique identifier of a database shard instance (e.g., UID), a location of a database shard instance or a compute node (e.g., hostname and internet protocol (IP) address), a type of a database shard instance (asynchronous, synchronous, and master), a list of associated shards (e.g., shard IDs of associated shard instances that are being replicated: for a master shard instance, a list of slave shard instances; for a slave shard instance, a shard ID of the master shard instance), a synchronization priority (priority order of one or more slave instances in a shard replication group that defines an order in which the one or more slave instances will be promoted to synchronous slave), and an isolation priority (e.g., read write, read only, or no service).

A compute node can further include a key management module. The key management module can perform operations on a cryptographic key database. In some examples, the key management module can perform operations on a portion of the cryptographic key database. In addition, in some examples, the key management module of the compute node can also perform operations on other portions of the cryptographic key database on other compute nodes. In such examples, the key management module of the compute node can operate directly with the other portions of the cryptographic key database on other compute nodes, creating a logical multi-master appearance.

In some examples, an external client device can access the cryptographic key database by communicating with any compute node in the plurality of compute nodes. The client device can use a key management communication protocol (e.g., Key Management Interoperability Protocol [KMIP]). In some examples, an administrator device can also access the cryptographic key database by communicating with any compute node in the plurality of compute nodes. The administrator device can setup and configure a key management database by initiating operations that act on replicated database shard instances of the key management database, including create, configure, destroy, start, stop, and reconfigure.

As described above, each compute node can include an administrator interface (e.g., web UI and/or API) and a configuration logic module. The external client can communicate with the administrator interface of a compute node to configure the compute node. In some examples, the external client can communicate with the administrator interface of a first compute node to configure a database located on a second compute node. In such examples, a configuration logic module of the first compute node can process the communication from the external client and send the communication to an administrator interface of the second compute node.

In some examples, a key management system can be included on a plurality of compute nodes. As described above, each compute node can include an administrator interface (e.g., web UI and/or API), a configuration logic module, a shard instance property table, a key management module, and a cryptographic key database. In such examples, the cryptographic key database can be split into multiple database shards. Multiple database instances can be created for a shard (sometimes referred to as a shard replication group). Multiple database shard instances can be on a compute node. In such examples, a database shard replication group can include a master instance, a local slave instance, and a synchronous slave instance (local or remote). In some examples, the synchronous slave instance can be the local slave instance. In some examples, the database shard replication group can further include one or more asynchronous slave instances (local and/or remote).

In some examples, from a physical perspective, the key management system described above can include a master-slave replication model for each database shard replication group. Each database shard replication group can include a master shard instance, a synchronous slave instance, and, optionally, one or more asynchronous slave instances. Using the master-slave replication model for a shard replication group can provide better consistency and tolerance to network partitions. From a logical perspective, the entire key management system can be viewed as a multi-master system because a client can communicate with any compute node to perform operations to the key database, even if a portion of the key database associated with an operation is located on a separate compute node than the client communicates with. This is because a key management module on each compute node can communicate with either a database or a key management module of every other compute node in the plurality of compute nodes. This design provides better efficiency because database shards can be indexed faster. This also provides better load balancing because operations can be sent to any compute node (these operations can then be redirected by a key management module of the received compute node to an appropriate compute node with a database associated with the operations).

FIG. 1 illustrates an example of a key management system on two compute nodes (i.e., compute node 1 110 and compute node 2 130). The compute node 1 110 can include a key management module 112 and a key database 114. The key management module 112 can perform one or more operations on the key database 114. The key management module 112 can communicate with the key database 114. In some examples, the key database 114 can include one or more instances of the key database 114.

The compute node 1 110 can further include a shard instance property table 116, a configuration logic module 118, a web UI 120, an API 122, or any combination thereof. The shard instance property table 116 can include properties of database shard instances of the key database 114. For example, the shard instance property table 116 can include a synchronization priority list for slave instances of a master instance of the key database 114. In such an example, the synchronization priority list can define an order in which asynchronous slave instances will be promoted to a synchronous slave instance for the master instance.

The shard instance property table 116 can also include information on an isolation policy for one or more master shard instances. If a compute node is isolated due to a network partition, an isolation policy for a master shard instance (from a shard instance property table) may be either read only, read write, or no service. In the case of a read-only isolation mode, all connections can be redirected to a (now) synchronous local slave instance (thus rendering the system read only). In the case of a read-write isolation mode, all connections can be redirected to a shard master instance (thus rendering the system read write). In the case of a no-service isolation mode, all operations can be disabled, whether read or write. This would ensure that no inconsistent data would be returned to a client.

The key management module 112 can read information from the shard instance property table 116. The shard instance property table 116 can communicate with the key management module 112. The configuration logic module 118 can communicate with the shard instance property table 116. The configuration logic module 118 can coordinate operations on replicated shard instances of the key database 114. Both the web UI 120 and the API 122 can communicate with the configuration logic module 118. In some examples, an admin 124 can communicate with the web UI 120 and the API 122. In such examples, the admin 124 can include external administrator software to communicate with the configuration logic module 118. The external administrator software can setup and configure the key database 114 by communicating with the configuration logic module 118, or one or more other configuration logic modules in other compute nodes. In some examples, the admin 124 can use the web UI 120 or the API 122 to communicate with the configuration logic module 118. In some examples, the configuration logic module 118 can read and/or write to the shard instance property table 116.

The compute node 2 130 can include a key management module 132 and a key database 134. The key management module 132 can perform operations on the key database 134. The key database 134 can include one or more instances of the key database 134. The key database 134 can also include one or more instances of the key database 114. Likewise, the key database 114 can also include one or more instances of the key database 134.

The key management module 132 can communicate with the key database 134. In some examples, the key database 114 of the compute node 1 110 can communicate with the key database 134 of the compute node 2 130. In some examples, the key management module 132 of the compute node 2 130 can further communicate with the key database 114 of the compute node 1 110 (e.g., perform an operation associated with the key database 114). In such examples, the key management module 112 of the compute node 1 110 can communicate with the key database 134 of the compute node 2 130 (e.g., perform an operation associated with the key database 134).

The compute node 2 130 can further include a shard instance property table 136, a configuration logic module 138, a web UI 140, and an API 142. The shard instance property table 136 can include properties of database shard instances for the key database 134. The shard instance property table 136 can communicate with the key management module 132. The configuration logic module 138 can communicate with the shard instance property table 136. The configuration logic module 138 can coordinate configuration operations on replicated shard instances in the key database 134. And both the web UI 140 and the API 142 can communicate with the configuration logic module 138. In some examples, the configuration logic module 138 of the compute node 2 130 can communicate with the API 122 of the compute node 1 110 (e.g., to send a configuration operation associated with the key database 114). In such examples, the configuration logic module 118 of the compute node 1 110 can communicate with the API 142 of the compute node 2 130 (e.g., to send a configuration operation associated with the key database 134).

A client 150 can communicate with the compute node 1 110 using the key management module 112. The client 150 can also communicate with the compute node 2 130 using the key management module 132. In some examples, the client 150 can include client software to access a key database by interfacing with a key management module. In some examples, the client 150 can interface with a key management module on a first compute node to access a key database on a second compute node. In such examples, the first compute node and the second compute node can be in a plurality of compute nodes.

In some examples, the client 150 can communicate with a load balancer 160, which can direct the client to either the key management module 112 of the compute node 1 110 or the key management module 132 of the compute node 2 130. The load balancer 160 can be used to improve a distribution of workload across compute nodes in a plurality of compute nodes.

In some examples, the client software can use a key management communication protocol (e.g., KMIP) to communicate with a key management module. In some examples, an administrator (e.g., admin 124) can be connected to a compute node. The admin 124 can initiate operations on key database on any compute nodes in the plurality of compute nodes from the compute node. For example, using a configuration logic module, the admin 124 can initiate operations on a key management system, including create, destroy, start, stop, and reconfigure.

Figure 2:
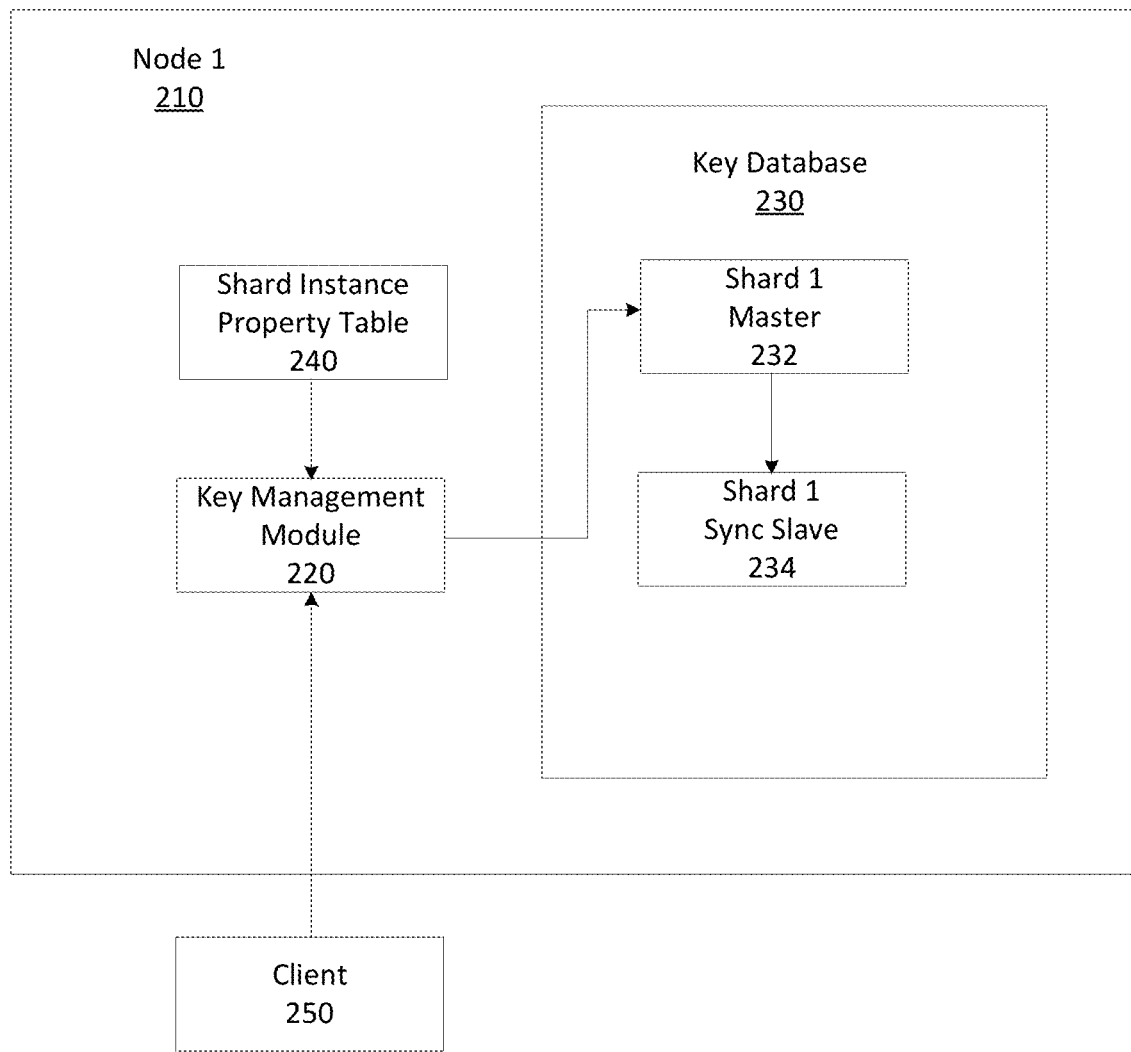
FIG. 2 illustrates an example of a compute node with a database shard replication group.

FIG. 2 illustrates an example of a compute node 1 210 with a database shard replication group. The database shard replication group includes two shard instances (i.e., shard 1 master 232 and shard 1 sync slave 234). In the disclosure herein, the word sync is used to represent synchronous and the word async is used to represent asynchronous. For clarity, FIG. 2 has been simplified, showing only the functional components relevant to the example.

The compute node 1 210 includes a key management module 220 and a key database 230. As described above, the key database 230 includes the shard 1 master 232 and the shard 1 sync slave 234. The shard 1 master 232 can communicate with the shard 1 sync slave 234. In addition, the key management module 220 can communicate with the shard 1 master 232.

The compute node 1 210 further includes a shard instance property table 240. The shard instance property table 240 can communicate with the key management module 220. FIG. 2 further includes a client 250. The client 250 can be remote from the compute node 1 210 and communicate with the key management module 220.

Figure 3:
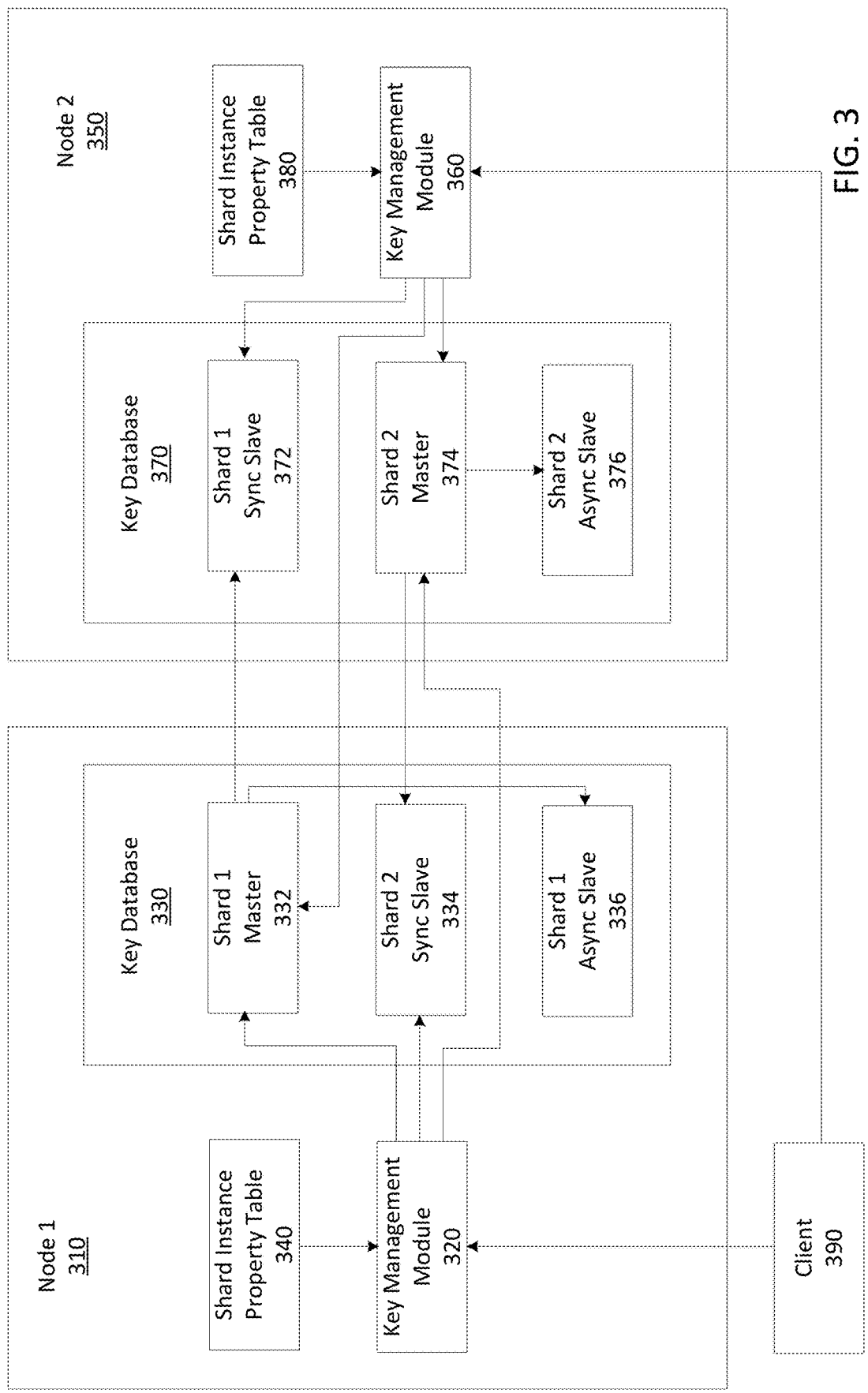
FIG. 3 illustrates an example of two compute nodes with two database shard groups.

FIG. 3 illustrates an example of two compute nodes (i.e., compute node 1 310 and compute nodes 2 350) with two database shard groups. The two database shard groups both include three slave instances. In particular, the compute node 1 310 includes a key management module 320 and a key database 330. The key database 330 includes a shard 1 master 332, a shard 2 sync slave 334, and a shard 1 async slave 336. The compute node 1 310 can further include a shard instance property table 340.

The compute node 2 350 can include a key management module 360 and a key database 370. The key database 370 can include a shard 1 sync slave 372, a shard 2 master 374, and a shard 2 async slave 376. The compute node 2 350 can further include a shard instance property table 380. In some examples, a first data shard group can include the shard 1 master 332, the shard 1 sync slave 372, and the shard 1 async slave 336. In such examples, a second data shard group can include the shard 2 master 374, the shard 2 sync slave 334, and the shard 2 async slave 376.

In some examples, the shard 1 master 332 can duplicate its data synchronously with the shard 1 sync slave 372. In such examples, the shard 1 master 332 can also duplicate its data asynchronously with the shard 1 async slave 336. In some examples, the shard 2 master 374 can duplicate its data synchronously with the shard 2 sync slave 334. In such examples, the shard 2 master 374 can also duplicate its data asynchronously with the shard 2 async slave 376.

The example of FIG. 3 can further include a client 390. The client 390 can communicate with one or more of the key management module 320 of the compute node 1 310 and the key management module 360 of the compute node 2 350.

C. Network Partition Events

A network partition event can cause a network partition on a network. In some examples, the network partition can interrupt communications between portions of the network (e.g., a first compute node might no longer be able to communicate with a second compute node). In such examples, if a master shard instance is isolated from its synchronous slave shard instance, the next accessible slave instance with the highest priority (determined using a shard instance property table) can be promoted to the new synchronous slave shard instance. For example, if a remote synchronous slave exists but is unavailable (due to, for example, a network partition), a local slave can become the synchronous slave.

If a compute node is isolated due to a network partition, an isolation policy for a master shard instance (determined using a shard instance property table) may be either read only, read write, or no service. In the case of a read-only isolation mode, all communications can be redirected to a (now) synchronous local slave instance. And because the communications are not going to a master instance, which are responsible for writing new data, the system can be converted into a read-only mode. In the case of a read-write isolation mode, all communications can be redirected to a shard master instance. And because the communications are going to a master instance, which are responsible for writing new data, the system can continue to write new data as well as read data. In the case of a no-service isolation mode, all operations can be disabled or paused, waiting for the network partition to be over. This would ensure that no inconsistent data would be returned to a client. In such examples, the operations can be put into a queue, to be processed after the network partition is over.

In the case of a planned and unplanned network partition event, a key management system can initiate a switchover operation for a particular shard replication group. The switchover operation can allow an administrator software to change a current master of the particular shard replication group, and to continue supporting full operation during the network partition event. The key management system can have two modes to perform the switchover operation: a switchover for a planned network partition event and a failover for an unplanned network partition event. When a new master shard instance is created, the new master shard instance can inform its shard replication group that it is the new master shard instance.

Figure 4A:
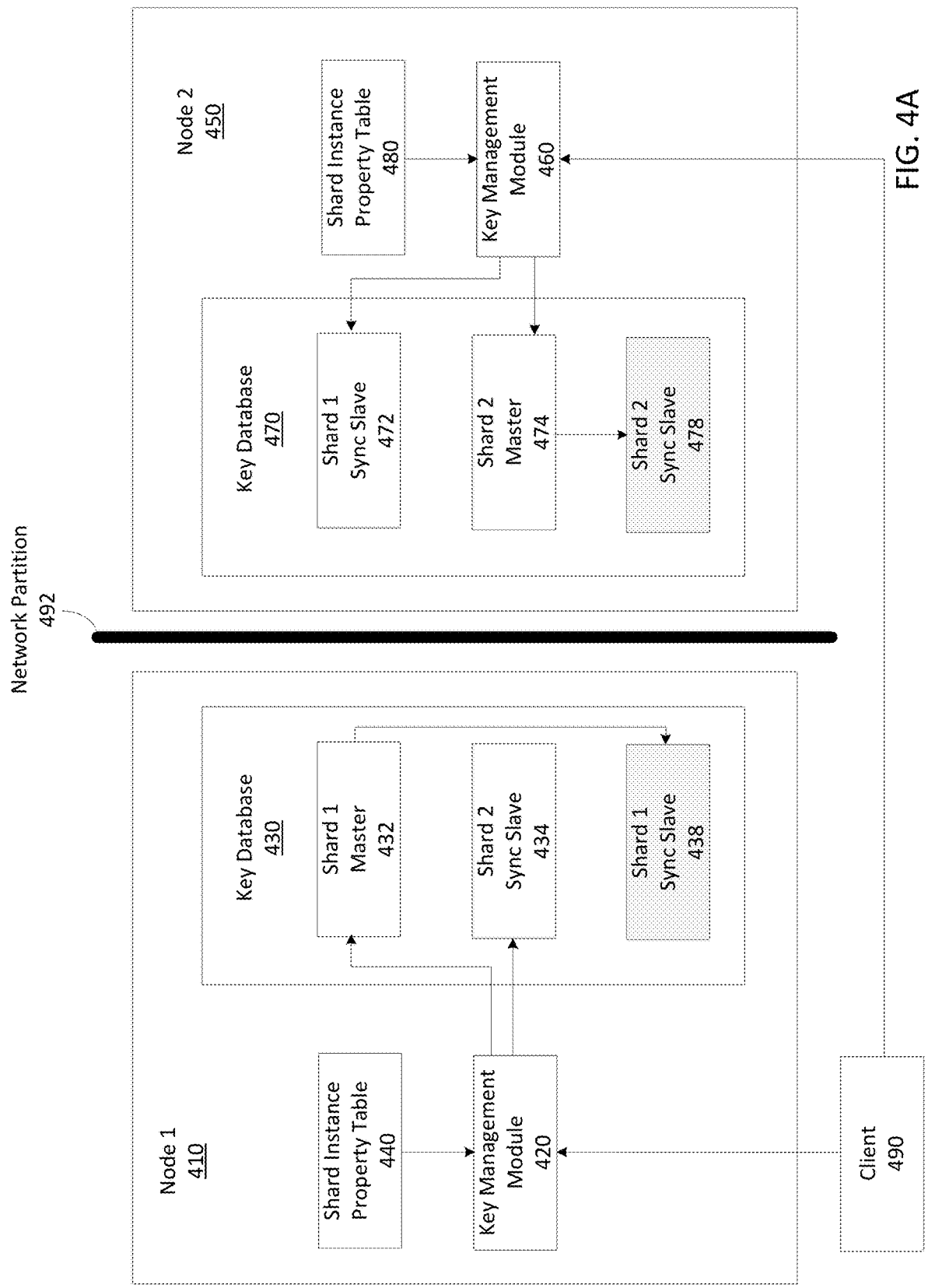
FIG. 4A illustrates an example of a result of a network partition between two compute nodes under a read-write isolation mode.

FIG. 4A illustrates an example of a result of a network partition 492 between two compute nodes (e.g., the compute node 1 310 and the compute node 2 350 of FIG. 3) under a read-write isolation mode. After a network partition event that causes the network partition 492, an asynchronous slave shard instance can be promoted to a synchronous slave shard instance. For example, the shard 1 async slave 436 can be promoted to a shard 1 sync slave 438. The shard 2 async slave 476 can also be promoted, to a shard 2 sync slave 478. In this example, a local synchronous slave shard instance is promoted; however, the particular slave shard instance that is promoted will depend on a slave priority from the shard instance property table (e.g., the shard instance property table 440).

In this example, the isolation mode (from a shard instances properties table) for both master shard instances can be read write. For example, the key management module 420 of the compute node 1 410 can communicate with the shard 1 master 432 and the shard 2 sync slave 434. In such an example, the shard 1 master 432 can communicate with the (new) shard 1 sync slave 438. In addition, the key management module 460 of the compute node 2 450 can communicate with the shard 2 master 474 and the shard 1 sync slave 472. In such an example, the shard 2 master 474 can communicate with the shard 2 sync slave 478. This mode of operation can have better availability but the consistency is not guaranteed. In some examples, the isolation modes can differ for master shard instances in different shard replication groups. By allowing different isolation modes, the system can balance availability and consistency.

Figure 4B:
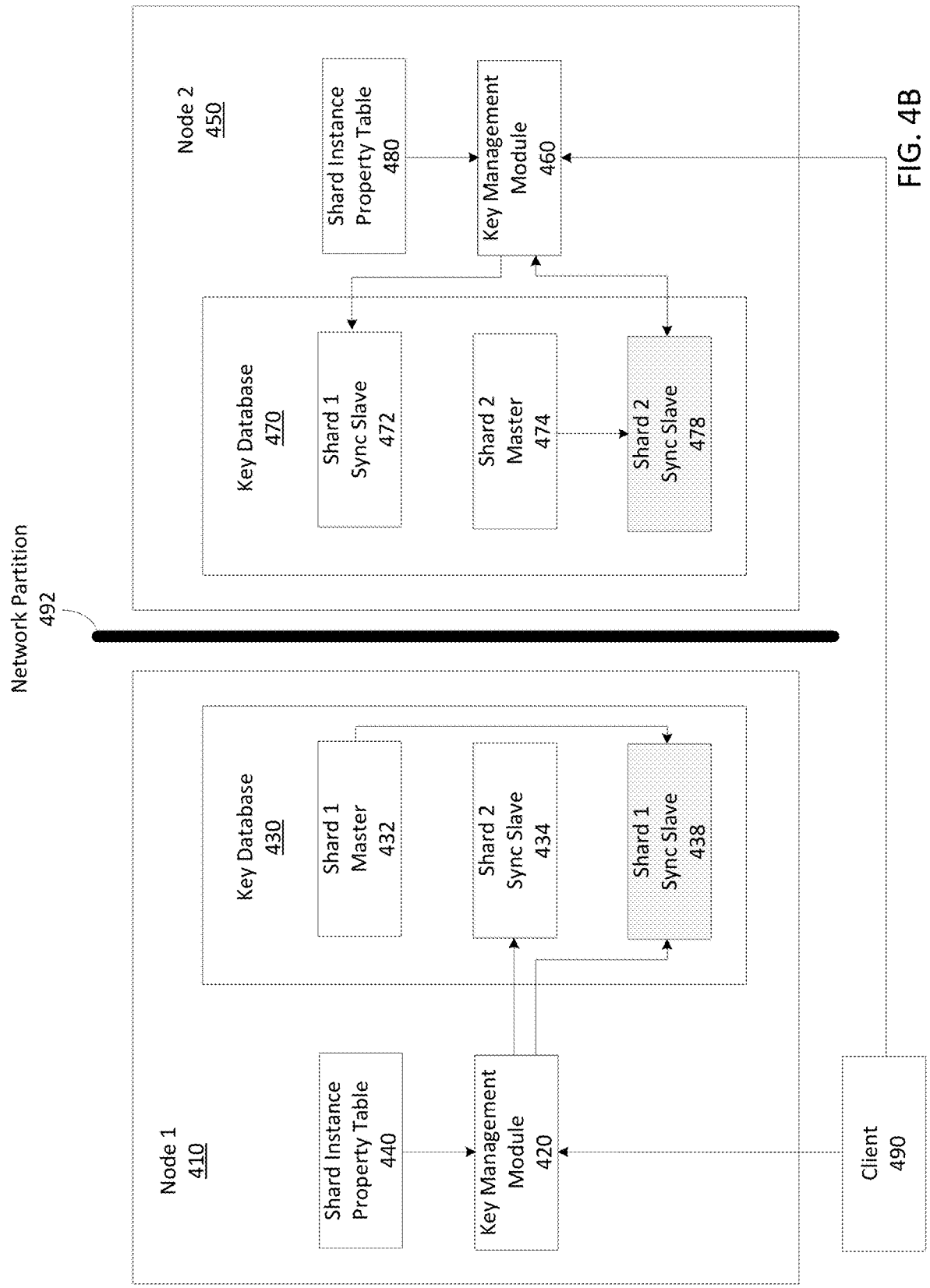
FIG. 4B illustrates an example of a result of a network partition between two compute nodes under a read-only isolation mode.

FIG. 4B illustrates an example of a result of a network partition 492 between two compute nodes (i.e., the compute node 1 310 and the compute node 2 350 of FIG. 3) under a read-only isolation mode. While the entities of FIG. 4B are the same as 4A, the instances that the respective key management modules communicate with are different. For example, the key management module 420 can communicate with the shard 1 sync slave 438 and the shard 2 sync slave 434 (and not the shard 1 master 432). In addition, the key management module 460 of the compute node 2 450 can communicate with the shard 1 sync slave 472 and the shard 2 sync slave 478.

Figure 4C:
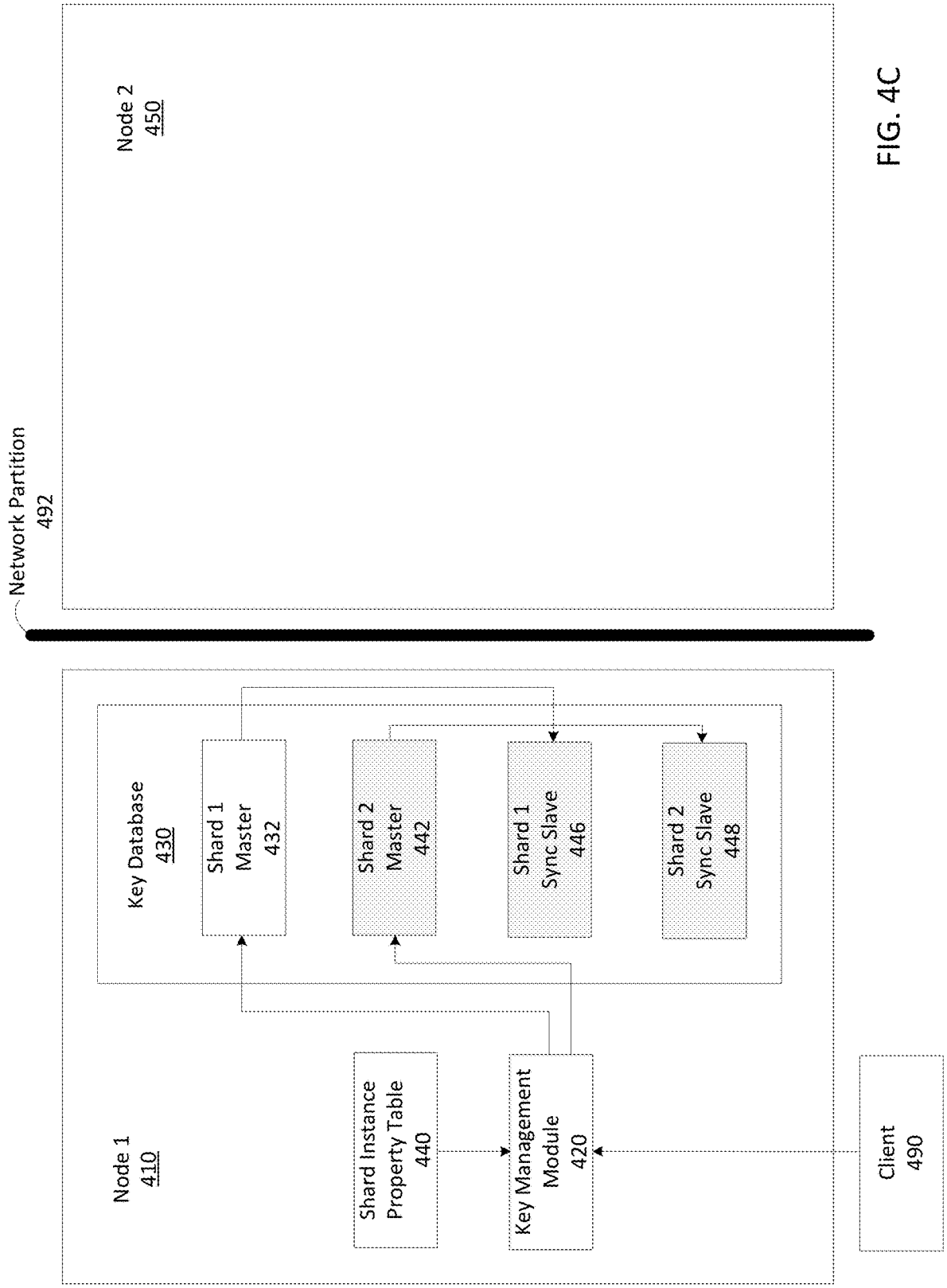
FIG. 4C illustrates an example of two compute nodes and two database shard replication groups during a switchover operation.

FIG. 4C illustrates an example of two compute nodes (e.g., compute node 1 410 and compute node 2 450) and two database shard replication groups during a switchover operation. The switchover operation can be initiated by an administrator and coordinated using a configurations logic module. In the example, the two database shard replication groups included three shard instances for each shard replication group before a network partition event that caused the network partition 492. The switchover operation can cause a master shard instance to migrate from one compute node to another. For example, in FIG. 4C, the shard 2 master 474 of the compute node 2 450 is migrated to the compute node 1 410 as a shard 2 master 442. In such an example, the slave 1 async slave 436 can be promoted to a slave 1 sync slave 446. The shard 1 master 432 can communicate with the shard 1 sync slave 446. In addition, the slave 2 sync slave 434 can be promoted to a shard 2 master 442. Even more, a (new) slave 2 sync slave 448 can be created on compute node 1 410. The shard 2 master 442 can communicate with the shard 2 sync slave 448. In some examples, a master shard instance can be created on another compute node. The data for the master shard instance on the other compute node can be obtained using a slave instance of the original master shard instance.

Figure 5:
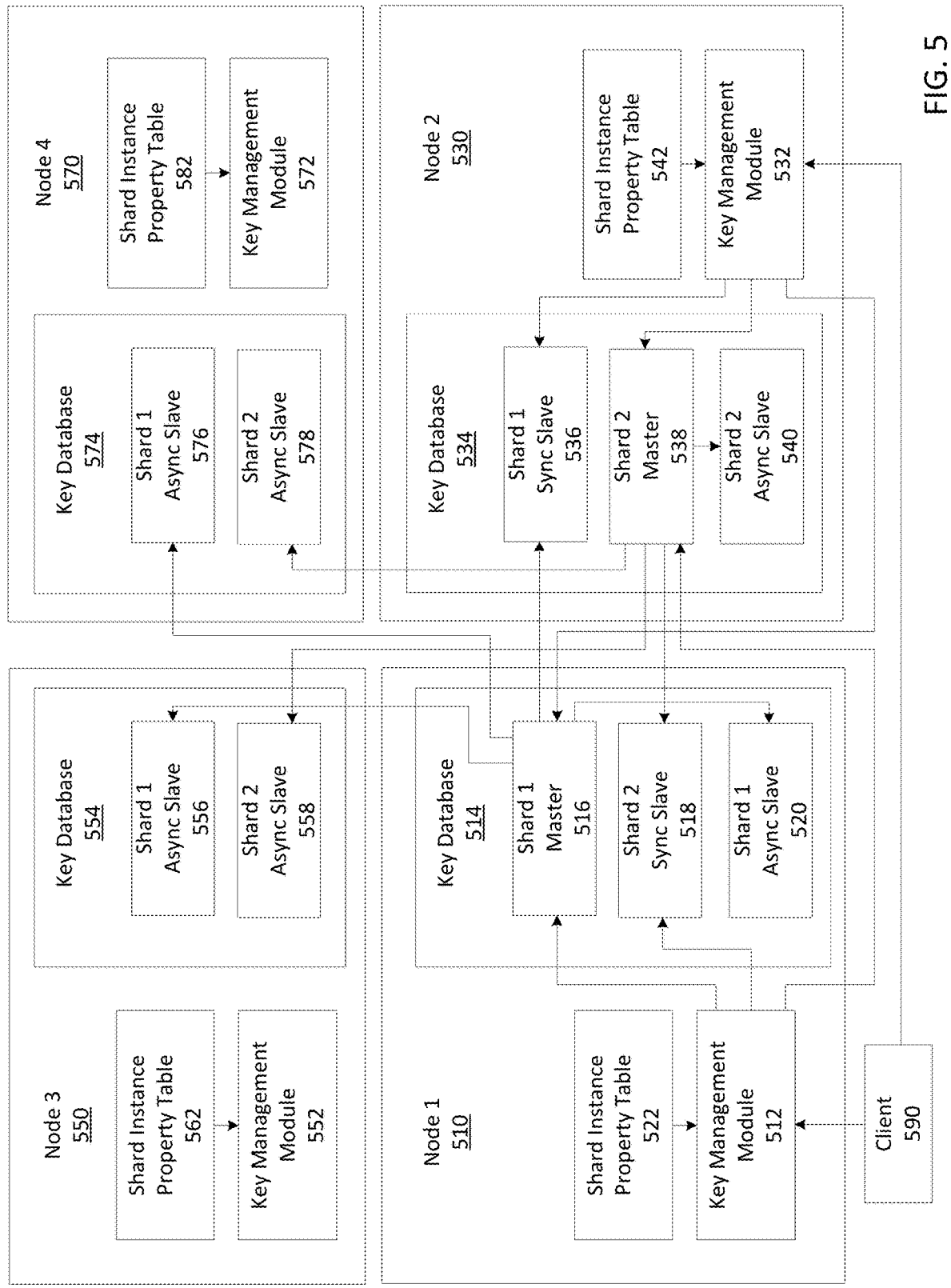
FIG. 5 illustrates an example of four compute nodes deployed as a distributed key management system.

FIG. 5 illustrates an example of four compute nodes (e.g., compute node 1 510, compute node 2 530, compute node 3 550, and compute node 4 570) deployed as a distributed key management system. The example includes two shard replication groups, each with five shard instances in each shard replication group. A master shard instance is configured on a compute node without another master compute node. However, a person of ordinary skill in the art will recognize that two or more master shard instances can be on the same compute node.

The compute node 1 510 can include a key management module 512 and a key database 514. The key database 514 can include a shard 1 master 516, a shard 2 sync slave 518, and a shard 1 async slave 520. The compute node 1 510 can further include a shard instance property table 522.

The compute node 2 530 can include a key management module 532 and a key database 534. The key database 534 can include a shard 1 sync slave 536, a shard 2 master 538, and a shard 2 async slave 540. The compute node 2 530 can further include a shard instance property table 542.

The compute node 3 550 can include a key management module 552 and a key database 554. The key database 554 can include a shard 1 sync slave 556 and a shard 2 async slave 558. The compute node 3 550 can further include a shard instance property table 562.

The compute node 4 570 can include a key management module 572 and a key database 574. The key database 574 can include a shard 1 sync slave 576 and a shard 2 async slave 578. The compute node 4 570 can further include a shard instance property table 582.

In the example of FIG. 5, the shard instance property table 522 of the compute node 1 510 can communicate with the key management module 512 of the compute node 1 510. The key management module 512 can communicate with the shard 1 master 516 of the compute node 1 510, the shard 2 sync slave 518 of the compute node 1 510, and the shard 2 master 538 of the compute node 2 530. The shard 1 master 516 of the compute node 1 510 can communicate with the shard 1 async slave 520 of the compute node 1 510, the shard 1 sync slave 536 of the compute node 2 530, the shard 1 async slave 558 of the compute node 3 550, and the shard 1 async slave 578 of the compute node 4 570.

The shard instance property table 542 of the compute node 2 530 can communicate with the key management module 532 of the compute node 2 530. The key management module 532 can communicate with the shard 2 master 538 of compute node 2 530, the shard 1 sync slave 536 of the compute node 2 530, and the shard 1 master 516 of the compute node 1 510. The shard 2 master 538 of the compute node 2 530 can communicate with the shard 2 async slave 540 of the compute node 2 530, the shard 2 sync slave 518 of the compute node 1 510, the shard 2 async slave 558 of the compute node 3 550, and the shard 2 async slave 578 of the compute node 4 570.

In some examples, the example of FIG. 5 can further include a client 590. The client 590 can communicate with one or more of the key management module 512 of the compute node 1 510 and the key management module 532 of the compute node 2 530. If the client 590 communicates with the key management module 512 of the compute node 1 510, but is requesting to write to the shard 2 master 538, the key management module 512 can communicate with the shard 2 master 538 of the compute node 2 530 to complete the request by the client 590.

Figure 6:
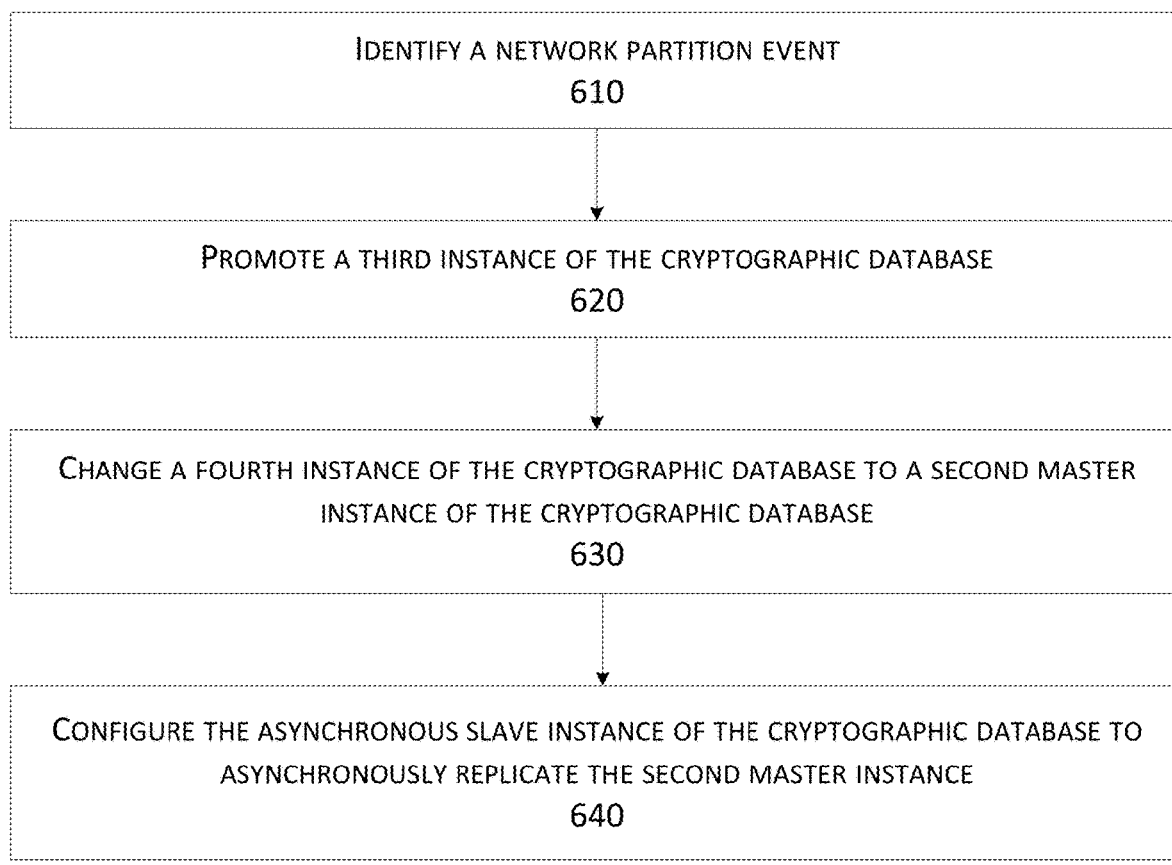
FIG. 6 is a flowchart illustrating an embodiment of a process for managing cryptographic information.

FIG. 6 is a flowchart illustrating an embodiment of a process 600 for managing cryptographic information. In some aspects, the process 600 can be performed by a key management module.

Process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a machine-readable storage medium, for example, in the form of a computer program comprising a plurality of instructions executable by one or more processors. The machine-readable storage medium can be non-transitory.

At step 610, the process 600 includes identifying a network partition event. In some examples, the network partition event can cause a network partition between a first node and a second node. In such examples, the network partition can interrupt communication between the first node and the second node.

In some examples, the first node can include a first master instance of a cryptographic database. In such examples, the cryptographic database can include one or more cryptographic keys, of which at least one cryptographic key is included in the first master instance. In some examples, the second node can include a first synchronous slave instance of the cryptographic database. In such examples, the first synchronous slave instance can be associated with the first master instance.

In some examples, an operation associated with the first master instance and the first synchronous slave instance can be complete when both the operation has completed on the master instance and a confirmation is received by the master instance. In such examples, the confirmation can indicate that the operation has completed on the first synchronous slave instance.

At step 620, the process 600 includes promoting a third instance of the cryptographic database in response to the network partition. In some examples, the first node can include the third instance. In some examples, the third instance can be changed from an asynchronous slave instance to a second synchronous slave instance. In such examples, the third instance can be associated with the master instance. In some examples, the third instance can be in communication with the master instance during the network partition event.

In some examples, an operation associated with the master instance and the asynchronous slave instance can be complete when the master instance acknowledges receipt of a request for the operation. In some examples, the first synchronous slave instance, the second synchronous slave instance, and the asynchronous slave instance can each be a replication of the master instance.

In some examples, the master instance can be associated with a shard of the cryptographic database. In such examples, the first synchronous slave instance, the second synchronous slave instance, and the asynchronous slave instance can be associated with the shard of the cryptographic database. In some examples, the cryptographic database can include a plurality of shards.

At step 630, the process 600 includes changing a fourth instance of the cryptographic database to a second master instance for the cryptographic database. In some examples, the second master instance can replace the first master instance as a master instance of a shard replication group of the cryptographic database. In such examples, the second master instance can be included on a third node, and the network partition event can isolate the first node from the second node and the third node. In some examples, the third node can be the second node. In some examples, the second master instance, the first synchronous slave instance, the second synchronous slave instance, and the asynchronous slave instance can be associated with the shard of the cryptographic database. At step 640, the process 600 includes configuring the asynchronous slave instance of the cryptographic database to asynchronously replicate the second master instance.

D. Example Systems

Figure 7:
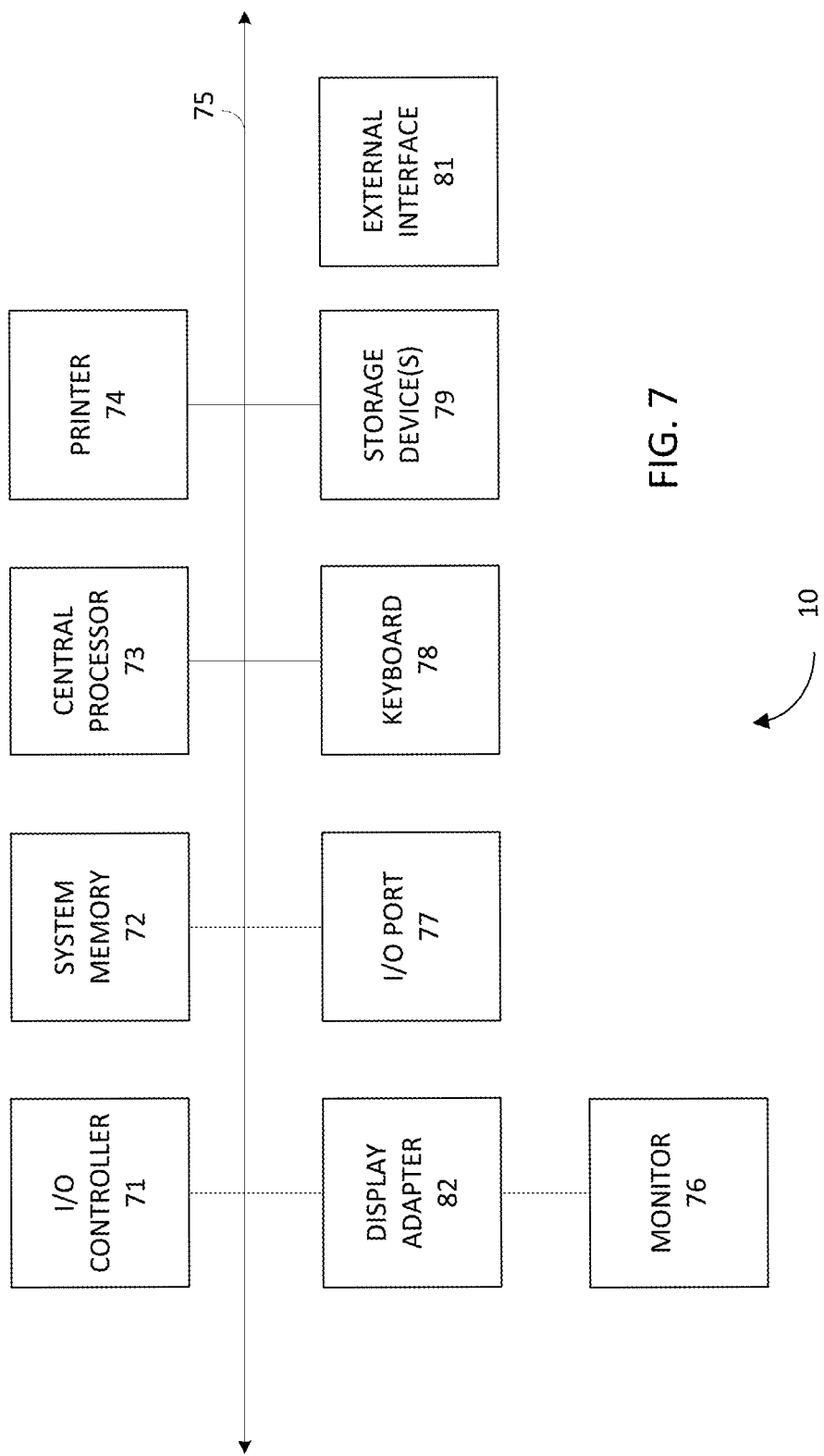
FIG. 7 illustrates an example of a computer system.

Any of the computer systems mentioned herein may utilize any suitable number of subsystems. Examples of such subsystems are shown in FIG. 7 in computer system 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

In the foregoing specification, aspects of this disclosure are described with reference to specific embodiments thereof, but those skilled in the art will recognize that this disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A compute node comprising:
    a local database including a master instance and a slave instance of a logical shard of a cryptographic key database, wherein the cryptographic key database is divided into a plurality of logical shards, wherein the master instance includes cryptographic data of the cryptographic key database, and wherein the slave instance replicates the cryptographic data;
    a key management module configured to perform key management operations on a plurality of cryptographic keys, the key management operations comprising database operations and client operations; and
    a shard instance property table, wherein the shard property table comprises information associated with content of the master instance.

2. The compute node of claim 1, wherein the slave instance replicates the master instance in a synchronous manner.

3. The compute node of claim 1, wherein the local database includes a second slave instance of the shard, wherein the slave instance is a first slave instance, and wherein the second slave instance replicates the master instance in an asynchronous manner.

4. The compute node of claim 1, wherein the key management module receives a request to perform a database operation from a remote device.

5. The compute node of claim 1, further comprising:
an interface to receive a request to configure the cryptographic key database from a remote device; and
a configuration module to process the request to configure the cryptographic key database.

6. The compute node of claim 5, wherein the interface includes at least one or more of a graphical user interface and a command line interface, wherein the command line interface uses an application programming interface (API).

7. The compute node of claim 1, wherein a remote compute node includes a second slave instance, wherein the slave instance is a first slave instance, and wherein the second slave instance replicates the cryptographic data.

8. The compute node of claim 1, wherein the key management operations comprise key usage authorization.

9. The compute node of claim 1, wherein the client operations comprise key generation.

* * * * *